United States Patent
Chung

(10) Patent No.: US 10,693,703 B1
(45) Date of Patent: Jun. 23, 2020

(54) DISPLAYING CONTENT ITEMS BASED ON DEVICE STATUS

(71) Applicant: Google LLC, Mountain View, CA (US)

(72) Inventor: Wook Jin Chung, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/966,319

(22) Filed: Apr. 30, 2018

Related U.S. Application Data

(63) Continuation of application No. 15/656,384, filed on Jul. 21, 2017, now Pat. No. 9,992,054, which is a continuation of application No. 14/064,894, filed on Oct. 28, 2013, now Pat. No. 9,729,380.

(51) Int. Cl.
| | |
|---|---|
| *H04L 29/08* | (2006.01) |
| *H04L 12/70* | (2013.01) |
| *H04L 12/859* | (2013.01) |
| *H04L 29/06* | (2006.01) |
| *G06Q 30/02* | (2012.01) |

(52) U.S. Cl.
CPC ... *H04L 29/08945* (2013.01); *G06Q 30/0275* (2013.01); *H04L 47/00* (2013.01); *H04L 47/2475* (2013.01); *H04L 63/00* (2013.01); *H04L 67/20* (2013.01); *H04L 67/325* (2013.01)

(58) Field of Classification Search
None
See application file for complete search history.

(56) References Cited

U.S. PATENT DOCUMENTS

| | | | |
|---|---|---|---|
| 6,757,762 B1 | 6/2004 | McCarthy et al. | |
| 8,615,221 B1 * | 12/2013 | Cosenza | H04W 68/005 |
| | | | 455/414.1 |
| 8,655,307 B1 * | 2/2014 | Walker | H04W 72/0493 |
| | | | 455/405 |
| 9,729,380 B1 | 8/2017 | Chung | |
| 9,992,054 B1 | 6/2018 | Chung | |

(Continued)

FOREIGN PATENT DOCUMENTS

WO     2011/130019 A2    10/2011

OTHER PUBLICATIONS

Khan "U.S. Office Action issued in U.S. Appl. No. 14/064,894, filed Oct. 28, 2013", dated Feb. 25, 2016, 23 pages.

(Continued)

*Primary Examiner* — Philip J Chea
*Assistant Examiner* — Hassan A Khan
(74) *Attorney, Agent, or Firm* — Fish & Richardson P.C.

(57) ABSTRACT

Methods, systems, and apparatus, including computer programs encoded on a computer storage medium, for presenting content items. In one aspect, a method includes identifying an opportunity to present a content item at a device and in a manner that precludes a user from accessing content of one or more applications executing on the device. Data relating to a status of each of the one or more applications are identified. A level of urgency for a user to access content of the one or more applications is determined based on the data. A response to the opportunity to present a content item is selected based on the level of urgency for the user to access content of the one or more applications. The response is selected from a first response that causes presentation of the content item and a second response that precludes presentation of the content item.

18 Claims, 4 Drawing Sheets

(56) References Cited

U.S. PATENT DOCUMENTS

| | | | | |
|---|---|---|---|---|
| 2006/0279256 A1* | 12/2006 | Bletsas | ............... | H02J 7/0047 320/128 |
| 2008/0201587 A1* | 8/2008 | Lee | ............... | G06F 1/3203 713/320 |
| 2009/0066722 A1* | 3/2009 | Kriger | ............... | G06Q 30/02 345/619 |
| 2009/0198580 A1* | 8/2009 | Broberg | ............... | G06Q 30/02 705/14.1 |
| 2009/0222343 A1 | 9/2009 | Greene et al. | | |
| 2010/0011538 A1* | 1/2010 | Demuynck | ........ | H04M 1/0212 16/367 |
| 2010/0121716 A1 | 5/2010 | Golan | | |
| 2012/0083258 A1* | 4/2012 | Rabii | ............... | H04W 52/0261 455/418 |
| 2012/0129496 A1* | 5/2012 | Park | ............... | G06F 3/0488 455/411 |
| 2012/0197727 A1* | 8/2012 | Kim | ............... | G06Q 30/02 705/14.64 |
| 2013/0185750 A1 | 7/2013 | Ayoub | | |
| 2013/0244633 A1* | 9/2013 | Jacobs | ............... | H04M 1/7253 455/415 |
| 2013/0304580 A1* | 11/2013 | Feadler | ............... | G06Q 30/0267 705/14.64 |
| 2014/0074615 A1* | 3/2014 | Hope | ............... | G06Q 30/0241 705/14.64 |
| 2014/0344055 A1* | 11/2014 | Sanghavi | ............... | G06Q 30/0267 705/14.55 |
| 2018/0026920 A1* | 1/2018 | Chen | ............... | H04L 51/04 455/486 |

OTHER PUBLICATIONS

Khan "U.S. Office Action issued in U.S. Appl. No. 14/064,894, filed Oct. 28, 2013", dated Aug. 9, 2016, 24 pages.

Khan "U.S. Office Action issued in U.S. Appl. No. 14/064,894, filed Oct. 28, 2013", dated Dec. 12, 2016, 26 pages.

Reichard "U.S. Office Action issued in U.S. Appl. No. 14/064,894, filed Oct. 28, 2013", dated Aug. 25, 2015, 28 pages.

U.S. Appl. No. 15/656,384 to Wook Jin Chung filed Jul. 21, 2017.

U.S. Appl. No. 14/064,894 to Wook Jin Chung filed Oct. 28, 2013.

\* cited by examiner

DISPLAYING CONTENT ITEMS BASED ON DEVICE STATUS

CROSS REFERENCE TO RELATED APPLICATIONS

This application is a continuation application of, and claims priority to, U.S. patent application Ser. No. 15/656,384, titled "DISPLAYING CONTENT ITEMS BASED ON DEVICE STATUS," filed on Jul. 21, 2017, which is a continuation application of, and claims priority to, U.S. patent application Ser. No. 14/064,894, titled "DISPLAYING CONTENT ITEMS BASED ON DEVICE STATUS," filed on Oct. 28, 2013. The complete disclosure of the above-identified priority applications is hereby fully incorporated herein by reference.

BACKGROUND

This specification relates to data processing and content presentation.

The Internet enables access to a wide variety of resources. For example, video, audio, web pages directed to particular subject matter, news articles, images, and other resources are accessible over the Internet. The wide variety of resources that are accessible over the Internet has enabled opportunities for content distributors to provide content items with resources that are requested by users. Content items are units of content (e.g., individual files or a set of files) that are presented in/with resources (e.g., web pages), for example, in response to a content item request that is initiated by code included in, or associated with, the resource. An advertisement is an example of a content item that advertisers can provide for presentation with particular resources, such as web pages and search results pages.

SUMMARY

In general, one innovative aspect of the subject matter described in this specification can be embodied in methods that include the actions of identifying an opportunity to present a content item at a device and in a manner that precludes a user from accessing content of one or more applications executing on the device; identifying data relating to a status of each of the one or more applications; determining, based on the data relating to the status of the one or more applications, a level of urgency for a user to access content of the one or more applications; and selecting a response to the opportunity to present a content item based on the level of urgency for the user to access content of the one or more applications, the response being selected from a first response that causes presentation of the content item and a second response that precludes presentation of the content item. Other embodiments of this aspect include corresponding systems, apparatus, and computer programs, configured to perform the actions of the methods, encoded on computer storage devices.

These and other embodiments can each optionally include one or more of the following features. Aspects can include precluding the presentation of the content item at a lock screen of the device in a manner that requires the user to dismiss the content item prior to accessing the one or more applications in response to selecting the second response.

The data relating to the status of the one or more applications can include at least one of data specifying a number of messages received by a messaging application subsequent to a previous user session with the messaging application, data specifying a level of charge for a battery that powers the device, data specifying motion of the device, and data specifying an orientation of the device. Determining the level of urgency can include predicting, based on an orientation of the device, that a camera of the device will be accessed and adjusting the level of urgency in response to the prediction.

Aspects can further include, in response to selecting the second response, precluding the presentation of a video content item prior to presentation of a video selected for viewing in a manner that prevents the user from viewing the video selected for viewing until the video content item has been presented. The data relating to the status of the one or more applications can include data specifying previous user interaction with the video player.

Aspects can further include obtaining content items periodically from a content item provider. The device can determine whether to display the content items based on the level of urgency. Aspects can further include determining, based on the data relating to the status of the one or more applications, that the status of a particular application of the one or more applications precludes the presentation of the content item irrespective of the level of urgency and in response, precluding the presentation of the content item.

Aspects can further include selecting content for the content item based on the level of urgency. Aspects can further include identifying a maximum duration for a video content item based on the level of urgency; and selecting the content item from a set of video content items having a duration that is less than the maximum duration.

The level of urgency can be based on historical user response to application statuses that are similar to the status of at least one of the one or more applications. Selecting a response to the opportunity to present a content item based on the level or urgency can include determining an urgency score based on the level or urgency; selecting the first response when the urgency score fails to meet an urgency score threshold; and selecting the second response when the urgency score meets the urgency threshold.

Particular embodiments of the subject matter described in this specification can be implemented so as to realize one or more of the following advantages. By evaluating device and application status, content items (e.g., advertisements, promotions, videos, etc.) can be provided when the user is more likely to be receptive to the content item. User frustration can be avoided by precluding the display of content items when it is determined that the user needs to access their device or particular content without delaying access by displaying a content item. The efficacy of a content item can also be improved by displaying the content item at a time when a user is more likely to be receptive to the content item.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
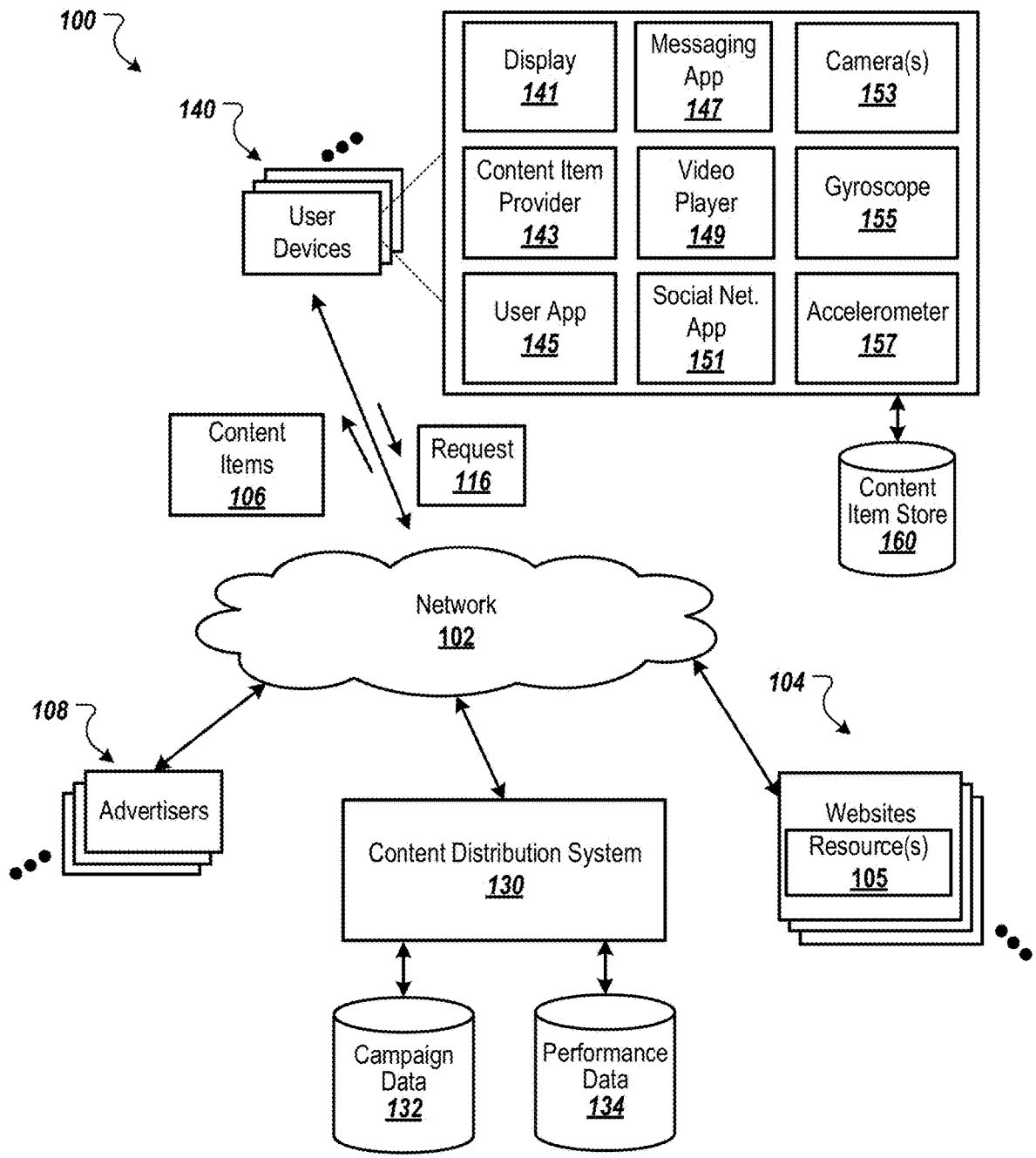
FIG. 1 is a block diagram of an example environment in which a user device presents content items.

Content items (e.g., advertisements, videos, promotions, etc.) can be presented on user devices in a manner that calls for a user to interact with or dismiss the content item prior to accessing the device, applications of the device, and/or content of the applications. For example, an advertisement may be presented on a lock screen of a mobile device or after the device is unlocked, or on another screen that calls for the user to interact with or dismiss the advertisement prior to accessing other elements of the device. In another example, a pre-roll video advertisement may be presented prior to presentation of a video selected by a user. In each example, the content item may be presented before the user is provided access to a particular device and/or particular content.

In some instances, it may be frustrating for the user to have to view or dismiss a content item prior to accessing requested content. For example, if the battery of a user's phone is low, the user may be in a hurry to access content on the phone before the battery loses its charge. An abundance of notifications can also increase the urgency of a user to access data regarding the notifications. For example, if the lock screen of the user's phone indicates that the user has missed several calls, the user may want quicker access to the phone to identify who made the calls. Having an advertisement presented prior to accessing such content can be frustrating for the user and can reduce the effectiveness of the advertisement. To reduce the likelihood that content items cause user dissatisfaction, a status of the user's device can be evaluated in order to determine whether to display a content item at the user device prior to providing access to the device or application.

As described in detail below, a determination can be made regarding whether to present or preclude the presentation of a content item on a user device based on data relating to the status of the device and/or data relating to the status of applications executing on or residing on the device. A determination can also be made whether to display a full size or full length version of a content item, or smaller or shorter version of a content item based on the status data. The status data can include data relating to the battery level, notifications for communication applications (e.g., new messages or missed calls), orientation of the device, motion of the device (e.g., accelerometer data), and/or recent or previous interactions with the device or an application, just to name a few examples. In some implementations, the system determines an urgency score using the status data. The urgency score can specify a level of urgency related to a user's need to access the device, an application of the device, and/or content of an application. Based on a comparison of the urgency score with an urgency threshold, the system can determine whether to present the content item or to preclude the presentation of the content item.

There may also be a particular device or application status that precludes the presentation of a content item (e.g., prior to the user accessing the device, an application, or particular content) irrespective of the urgency score. For example, if the device's battery level is less than a threshold level, a content item may not be presented although an urgency score that takes into account other data would normally allow for the presentation of the content item.

For situations in which the systems described here collect information about users, or may make use of information about users, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that certain information about the user is removed. For example, a user's identity may be treated so that no identifying information can be determined for the user, or a user's geographic location may be generalized where location information is obtained (such as to a city, ZIP code, or state level), so that a particular location of a user cannot be determined. Thus, users may have control over how information is collected about them and used by a content server.

FIG. 1 is a block diagram of an example environment 100 in which a user device 140 presents content items. The example environment 100 includes a network 102 such as a local area network (LAN), wide area network (WAN), the Internet, or a combination thereof. The network 102 connects websites 104, user devices 140, advertisers 108, and the content distribution system 130. The example environment 100 may include millions of websites 104, user devices 140, and advertisers 108.

A website 104 is one or more resources 105 associated with a domain name and hosted by one or more servers. An example website is a collection of web pages formatted in hypertext markup language (HTML) that can contain text, images, multimedia content, and programming elements, e.g., scripts. Each website 104 is maintained by a publisher, e.g., an entity that manages and/or owns the website 104.

A resource 105 is data provided by the website 104 over the network 102 and that is associated with a resource address. Resources include HTML pages, word processing documents, and portable document format (PDF) documents, images, video, and feed sources, to name only a few. The resources can include content, such as words, phrases, pictures, and so on, and may include embedded information (such as meta information and hyperlinks) and/or embedded instructions (such as scripts).

A user device 140 is an electronic device that is capable of requesting and receiving resources and content items 106 over the network 102. Example user devices 140 include personal computers, mobile computing devices, e.g., smartphones and/or tablet computing devices, that can send and receive data over the network 102. As used throughout this document the term mobile computing device ("mobile device") refers to a user device that is configured to communicate over a wireless and/or mobile communications network. A smartphone, (i.e., a phone that is enabled to communicate over the Internet) is an example of a mobile device. User devices 140 include a display screen 141, such as a touchscreen, that displays content to a user.

A user device 140 typically includes a user application 145, e.g., a web browser, to facilitate the sending and receiving of data over the network 102. A user device 140 may also include other user applications, such as messaging applications 147 (e.g., text messaging and/or e-mail applications), video players 149, social networking applications 151, productivity applications (not shown), and many other types of applications.

A user device 140 can also include sensors that can detect data relating to the status of the user device 140. For example, a user device 140 may include a gyroscope 155 that detects the orientation of the user device 140. A user device 140 may also include an accelerometer 157 that detects movement and acceleration of the user device 140. Other sensors may also be included on a user device 140.

A user device 140 can also include one or more cameras 153. For example, a user device 140 may include a front-facing camera and/or a rear facing camera. A front-facing camera typically faces the user while the user is viewing the display screen 141 of the user device 140. A rear-facing camera typically faces away from the user while the user is viewing the display screen.

A user device 140 can request resources 105 from a website 104. In turn, data representing the resource 105 can be provided to the user device 140 for presentation by the user device 140. The data representing the resource 105 can include resource content (e.g., text, images, videos, etc. of the resource 105) and content item slots (e.g., advertisement slots). When a resource 105 having a content item slot is requested by a user device 140, the content distribution system 130 receives a content item request 116 requesting content items to be provided with the resource content.

A content item request 116 can include data regarding the content item slots (e.g. size or type of content item slot), data regarding the resource 105 on which the content item will be presented (e.g., category or keywords found on the resource, data regarding publisher of resource, etc.), and/or other data. If the content items are to be presented in content item slots of a search results page, the content item request 116 may include keywords of a search query submitted to a search system.

The content distribution system 130 allows advertisers 108 or other content item providers to define campaign rules that take into account attributes of content item slots or resources on which content items (e.g., advertisements) are to be presented. Example campaign rules include keyword rules, in which an advertiser 108 provides bids for keywords that are present in either search queries or resource content. The campaign rules can also specify particular contextual data about a user device 140 on which content items are to be presented. For example, the advertisers 108 may define location-based rules to serve content items to user devices 140 that are within particular geographic areas.

When a user of a user device 140 selects an advertisement, the user device 140 generates a request for a landing page of the advertisement, which is typically a web page of the advertiser 108. For example, the advertisers 108 may each have respective web pages, some of which are landing pages for the advertisements of the advertisers 108.

The content distribution system 130 includes a data storage system that stores campaign data 132 and performance data 134. The campaign data 132 stores content items (e.g., advertisements), campaign information, bid values for content items, and budgeting information for advertisers 108. The performance data 134 stores data indicating the performance of the content items that are served. Such performance data can include, for example, click-through rates for content items, the number of impressions for content items, and the number of conversions for content items (e.g., purchase of a product in response to the display of an advertisement). Other performance data can also be stored.

A user device 140 and/or applications executing on the user device 140 can also submit content item requests 116 to the content distribution system 130. For example, a user device 140 may include a content item provider 143 that selectively presents content items on various user interfaces or display screens of the user device, such as a lock screen or notification screen. A lock screen is a user interface that controls access to the user device 140 by requiring the user to enter a password or perform some other action to access the user device 140. The user device 140 (or content item provider 143) may request content items to present on the lock screen or other screens from the content distribution system 130 periodically, such as once a day, multiple times a day, every other day, etc., and store the content items in a content item data store 160 installed on or communicably coupled to the user device 140. For example, the user device 140 may request content items in bulk each night when there is more bandwidth available and when the user device 140 may potentially have more available power dud to charging at night. The user device 140 may also (or in the alternative) send content item requests for content item presentation opportunities, such as in response to a user accessing (or interacting with) a lock screen of the user device 140.

As described in more detail below, the content item provider 143 can determine whether to present or to preclude presentation of a content item prior to the user accessing a device or content of an application (e.g., in a manner that temporarily prevents a user from accessing the device 140, an application of the device 140, or content of an application) based on certain status data. For example, the content item provider 143 may receive data relating to the status of the device's battery, applications executing or residing on the device (e.g., messaging application 147), and/or sensors (e.g., gyroscope 155) installed on the user device 140. Based on this status data, the content item provider 143 may determine if it is an appropriate time to present a content item at the device 140.

For example, a determination can be made regarding whether the urgency of the user's access to the device, or application content, is less than a threshold level of urgency. If so, the content item provider 143 may select a content item from the content item data store 160 and present the selected content item, e.g., at the display screen 141. If the user's urgency meets the threshold level of urgency, the user can be provided access to the device or application content without first being presented a content item.

Although the content item provider 143 is illustrated and described as being implemented as part of the user device 140, the content item provider 143 can be implementation at the content distribution system 130. In such implementations, the user device 140 may send status data (e.g., device and/or application status data) to the content distribution system 140, for example, in response to opportunities to present content items. The content distributions system 130 can determine whether to present a content item, select a content item and optionally content for the content item based on the status data. The content distribution system 130 can send the selected content item to the user device 140 for presentation. In this example implementation, the content item provider 143 can be updated more quickly to adjust the way in which the determinations for presenting a content item are made. In implementations in which the content item provider 143 is a part of the user device 140, the content item provider 143 can be updated periodically, for example, by downloading updated logic or rules to the user device 140.

Figure 2:
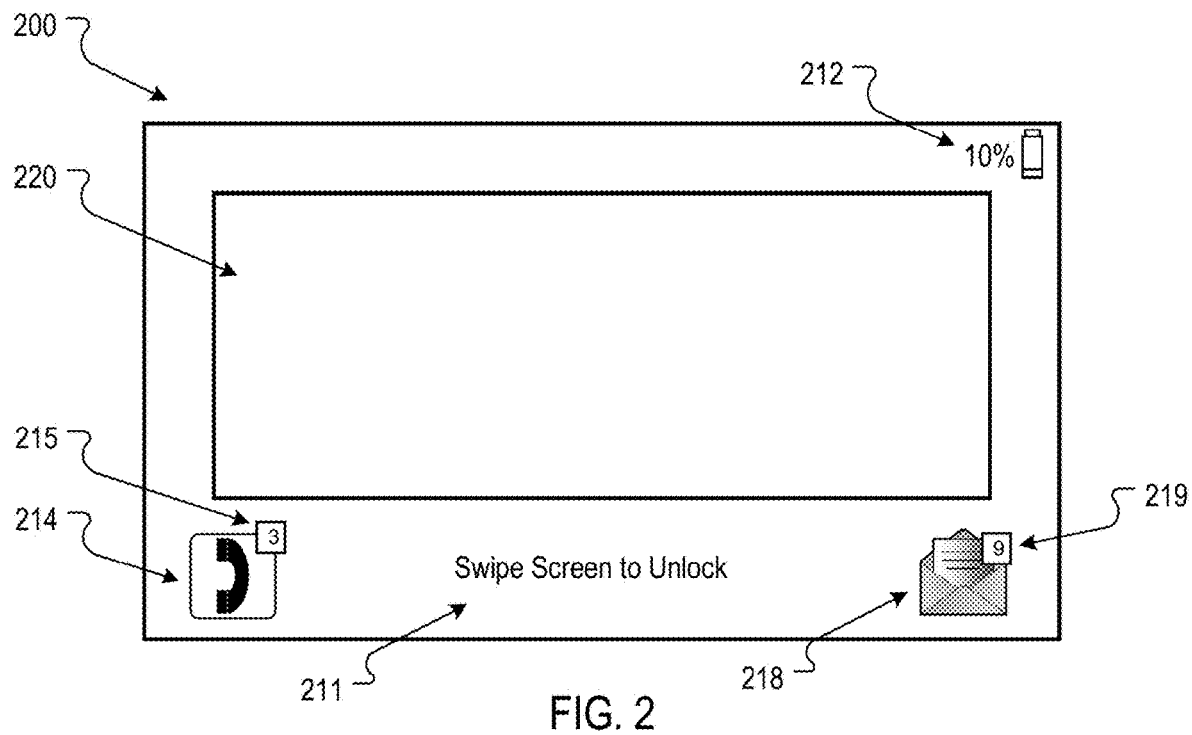
FIG. 2 is a block diagram depicting a screen shot of an example lock screen of a user device.

FIG. 2 is a block diagram depicting a screen shot of an example lock screen 200 of a user device. The example lock screen 200 includes several notifications, a display area 220, and instructions 211 for unlocking the lock screen 200. The display area 220 can be used to present content, such as the current time, date, a user-selected image, or other content. The display area 220 can also function as a content item slot, and be used to present a content item, such as an advertisement, promotional message, image, video, or text, selected by a content item provider, such as by the content item provider 143 of FIG. 1.

The notifications include a battery level indicator 212, a missed call notification 214, and a message notification 218. The battery level indicator 212 indicates the remaining charge of the device's battery. In this example, the battery has about 10% of its charge remaining. The missed call notification 214 indicates a number of missed calls 215 that the user device has received, which in this example is three calls. The number of missed calls may be the number of calls missed since the user device was last accessed, or since the call log of the user device was last accessed.

Although only one message indicator 218 is illustrated in FIG. 2, a lock screen may include multiple message indicators. A lock screen may include a message indicator for each of multiple messaging applications. For example, a lock screen may include a message indicator for each e-mail account set up on the user device, and a message indicator for a text messaging application. The example message indicator 218 includes a number of messages 219 that have been received by a messaging application, which in this example is nine messages. The number of messages may be the number of messages received since the user device was last accessed, or since the messaging application was last accessed. Other notifications can also be presented on a lock screen of a user device.

The notifications presented on a lock screen can be indicative of an estimated level or urgency ("level of urgency") for a user to access the device to check the notifications. For example, if a user checks their device and learns of several missed calls and messages, the user may want quicker access to their device to determine who has been calling and sending messages to the user than if there were no missed calls or messages. In situations when the user wants quicker access to their device, it may not be an appropriate time to present an advertisement in such a way that precludes the user from accessing the notifications without added delay. Conversely, if there are no notifications or only a few notifications, the user may be more receptive to an advertisement or other content item being presented prior to accessing the device. Thus, the number and type of notifications can be used to determine whether to present a content item, or to preclude the presentation of a content item, after the device has been unlocked. The notifications can also be used to select a content item and content for a content item, as described below.

Figure 3:
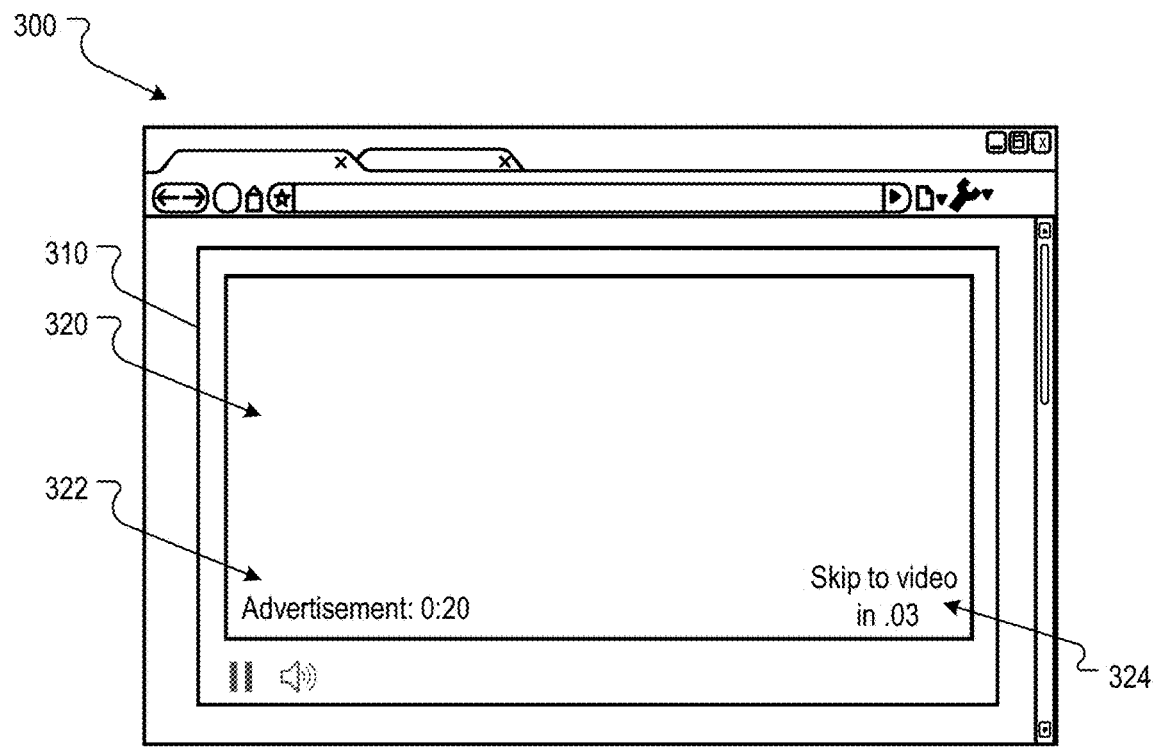
FIG. 3 is a block diagram of an example user interface for presenting videos.

FIG. 3 is a block diagram of an example user interface 300 for presenting videos. The example user interface 300 is provided in a web browser and includes a video player 310. For example, the video player 310 may be embedded in a web page that is presented in a web browser. The video player 310 may also be provided by another application other than the web browser, such as a video player application of a user device.

The example video player 310 includes a video display area 320 in which videos are presented. Videos selected or requested by a user may be displayed in the video display area 310. For example, a user may search (e.g., using a web browser or video player application) for a video related to a particular home improvement project. In response, search results that include links to videos related to home improvement may be presented to the user and the user may select a particular video to view. The selected video may then be presented to the user using the video player 310.

Video-based content items such as video advertisements may also be presented in the video display area 320 of the video player 310. For example, a pre-roll video advertisement (e.g., an advertisement that is presented prior to the presentation of a selected video) may be presented prior to a video selected by a user. The pre-roll advertisement may be related to the video that the user selected. For example, a video advertisement for a home improvement store may be presented prior to presentation of the home improvement video selected by the user.

In some implementations, a pre-roll video advertisement (or other content item that is presented before a selected video) may be required to run completely before the selected video can be presented. For example, all twenty seconds of a video advertisement may be presented before a selected video is presented. In some implementations, the video player 310 may allow the user to bypass the pre-roll advertisement immediately after the advertisement begins or after a pre-determined amount of time. For example, the video player 310 may allow a user to bypass a twenty second advertisement after the first three seconds of the advertisement. As described in more detail below, the video player 310 (or another device or application) may determine whether to allow a content item to be bypassed and/or the amount of time before a content item can be bypassed for each individual presentation of a content item.

The example video player 310 can display an advertisement duration indicator 322 that indicates the remaining duration of an advertisement or other content item. If a content item can be bypassed prior to its completion, the video player 310 can also display a skip indicator 324 that indicates the amount of time before a user can bypass the content item. After the time period has ended, an icon (or other user interface element) can be displayed that allows the user to bypass the remainder of the content item in response to user interaction with the icon.

In some instances, it may not be appropriate to present a content item prior to the presentation of a selected video. For example, a user may be searching for a particular video or a video that includes particular content, and during their search may have selected several videos without success and quickly returned to a search results page after viewing each video for only a short amount of time. In this situation, presenting an advertisement or other content item prior to a requested video may frustrate or distract the user from the user's purpose. Thus, information regarding a video player session may be used to determine whether to present a content item or to preclude presentation of the content item prior to presenting the selected video. For example, a determination of whether to present a content item prior to the presentation of a selected video may be based on a rate with which the user has viewed other videos and/or a number of times the user has returned to a search results page to select another video. Other device and application status can also be used in this determination, such as data regarding a mobile device's battery level.

Figure 4:
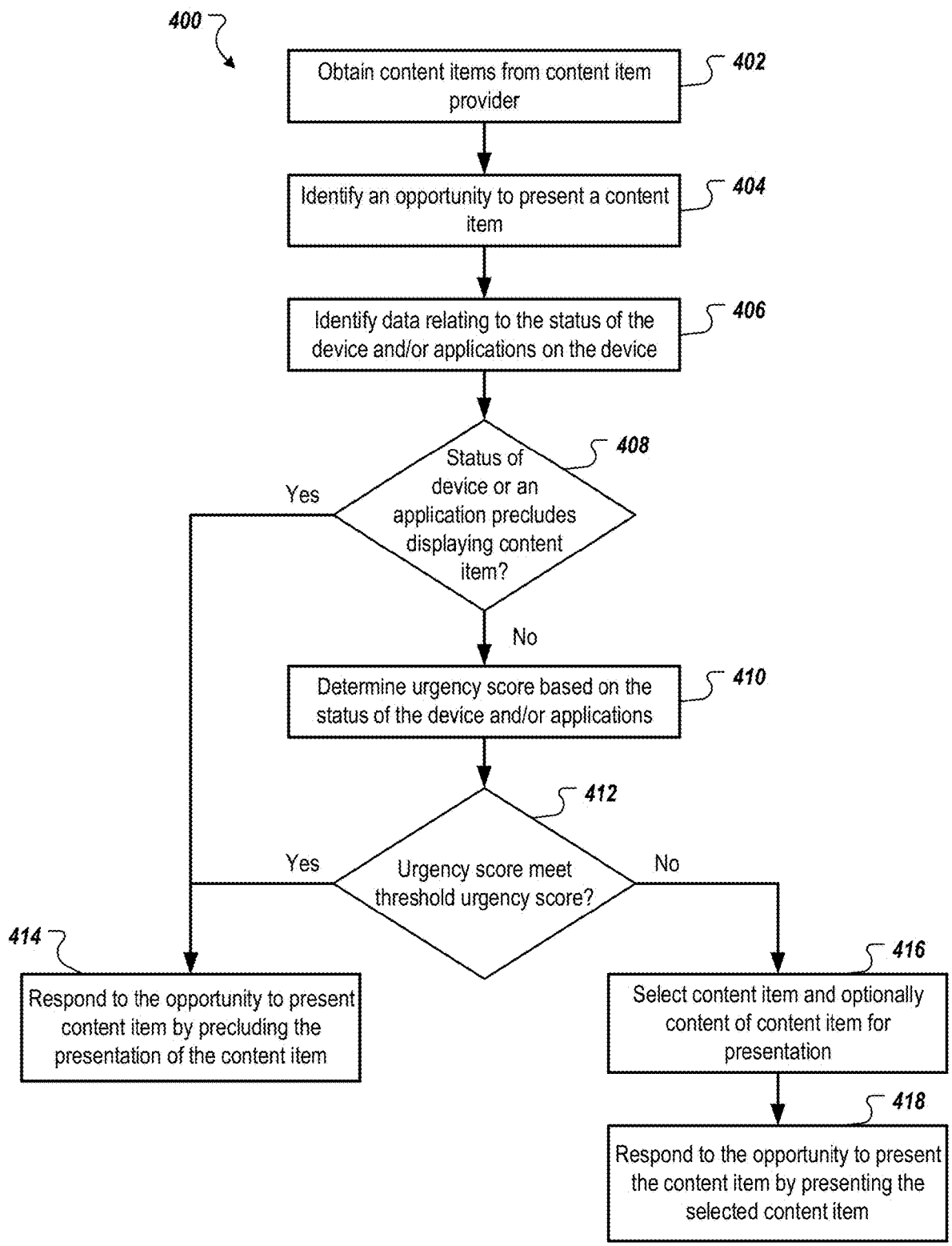
FIG. 4 is a flow chart of an example process for selectively providing a content item prior to providing access to requested content.

FIG. 4 is a flow chart of an example process 400 for selectively providing a content item prior to providing access to requested content. Operations of the process 400 can be implemented, for example, by a data processing apparatus, such as the user device 140 (e.g., using the content item provider 143) of FIG. 1. The process 400 can also be implemented by instructions stored on computer storage medium, where execution of the instructions by a data processing apparatus cause the data processing apparatus to perform the operations of the process 400.

Operations of the process 400 can also be implemented, for example, by the content distribution system 130 of FIG. 1. For example, data used to determine whether to present a content item described below may be sent from a user device 140 to the content distribution system 130 in response to a presentation opportunity. The content distribution system 130 can use the data to determine whether to present a content item, select a content item for presentation, and optionally content or a presentation format for the content item.

Content items, such as advertisements, are obtained (402). The content items can be obtained from a content item provider periodically (e.g., once a day) or just prior to presenting a content item at a user device. The content items can be stored in a content item data store for presentation at a later time. For example, content items may be obtained each night for potential presentation the next day.

An opportunity to present a content item is identified (404). As described above, a user device may present a content item at or on a lock screen, after a lock screen is unlocked, on a notification screen, or on another screen or at another appropriate time. For example, when a user device is powered on or awakened from a sleep mode, the device may present a lock screen for the user to unlock by performing a particular action (e.g., swiping and/or entering a password). In response, the user device may identify an opportunity to present a content item on the lock screen, or just after the device is unlocked.

An opportunity to present a content item may also be identified in response to the selection of other content to be presented. For example, an opportunity to present a pre-roll video advertisement may be identified in response to the selection of a desired video. An opportunity to present an audio advertisement may also be identified in response to the selection of an audio file, such as a song or news cast.

Data relating to the status of the user device and/or data relating to the status of one or more applications executing or residing on the user device are identified (406). Data relating to the status of the user device can include a level of charge on the device's battery, an amount of time since the user device was last accessed or powered on, how often the user device has been accessed recently, data relating to current or previous motion of the user device (e.g., whether the device is moving and/or accelerating), and/or data relating to the orientation of the user device. The data relating to the orientation of the user device may specify whether the user device is in a portrait orientation or in a landscape orientation, or somewhere in between. As described above, a user device can include a gyroscope for detecting the orientation of the user device and/or an accelerometer for detecting motion of the user device.

The user device can also obtain status data from applications and modules installed on the user device. If the user device is a smartphone or includes a phone module, the user device can obtain data relating to missed calls or received messages. This data can specify the number of calls missed and/or the number of messages received since the user device was last accessed or since the missed calls or messages were last checked.

The user device can also obtain data from text-based messaging applications. For example, the user device may obtain from a text messaging application (e.g., short messaging service "SMS" application) data relating to the number of messages received since the user device and/or the text messaging application was last accessed. Similarly, the user device may obtain from an e-mail application data relating to the number of e-mail messages received since the user device and/or the e-mail messaging application was last accessed.

Data regarding notification and status can also be obtained from other applications. For example, a social networking application can provide data regarding notifications for a social networking account. These notifications may include a number of new messages, a number of new social networking posts, and/or a number of social networking endorsements (e.g., "+1s") related to the social networking account. Notifications can also be obtained from games or other entertainment applications. For example, a game application may provide a notification to inform the user that it is the user's turn. Navigation applications can also provide notifications and/or status data (e.g., navigation is active or turned on). For example, a navigation notification may inform a user that the user is approaching a turn while navigating the user to a particular location.

With the approval of the user, the user device may also obtain data regarding the status of a user's environment. For example, the use may enable or disable the acquisition and use of data relating to the status of the user's environment. In some implementations, images of the user's environment that are captured using the camera module may be compared to a previous image to identify changes in the user's environment (e.g., an image of a mountain that was taken some time after an image of the city would indicate a change in the user's environment). The user device can also determine whether the user's environment has changed based on geographic location data (e.g., obtained from a Global Positioning System module) and/or light level detected by the user device. For example, a change in light level may indicate that the user device has changed environments.

A determination is made whether the status of the device or the status of an application precludes the presentation of a content item prior to the user accessing the device, an application, or content of an application (408). For example, certain statuses may indicate particular urgency or that it is otherwise not an appropriate time to present a content item. One such status is a very low battery status. If the battery of the user device is less than a threshold, such as less than 5%, then it may not be appropriate to present a content item. A navigation notification may also preclude the presentation of a content item. For example, a notification that the user is approaching a required turn during navigation may preclude the presentation of a content item. In addition, the presentation of a content item may be precluded when navigation is active.

The presentation of a content item can also be precluded in response to a determination or prediction that a user is navigating (e.g., walking, riding, driving, etc.) to another location. With the approval of the user, this determination can be made based on the motion of the user device and/or whether location-based services (e.g., navigation, map, or GPS), are active. If the user is also providing video, for example, from camera-enabled glasses to a content item provider 143 installed on the user device, the content item provider 143 can detect differences in frames of the video to determine whether the user is navigating to another location. The glasses may also include a compass or other orientation detecting device. Such a device can be used, with the approval of the user, to determine whether the user is focusing in the direction of motion. If the user is not focusing in the direction of motion (e.g., for at least a threshold percent of time), the user device may determine that the user is likely a passenger (e.g., on a bus or with another person) and allow the presentation of an advertisement. The user may enable or disable the acquisition and use of data relating to motion, location-based services, orientation devices, and video.

Another status that may preclude the presentation of a content item is a large number of notifications for one or more applications. For example, if the user has missed more than a threshold number of calls (e.g., ten or more), then the user may want to quickly determine what the calls are about. A total number of notifications across multiple applications can also be used to determine whether to preclude the presentation of a content item.

Another status that may preclude the presentation of a content item is whether a camera of the user device is about to be used. For example, a user may be trying to quickly capture a picture of something. The user device can predict whether the camera is going to be used based on the orientation of the user device. Many users arrange a user device, such as a smartphone, that includes a camera into a landscape mode before capturing pictures. Thus, if the user device detects that it is in (or approximately in) a landscape orientation (e.g., using data from a gyroscope), the user device may preclude the presentation of a content item. Similarly, if the user device detects that it is being rotated into a landscape mode (e.g., using data regarding the orientation and/or motion of the user device), the user device may preclude the presentation of a content item.

If a determination is made that the status of the device or an application precludes the presentation of a content item, the user device responds to the opportunity to present a content item by precluding presentation of a content item (414). If a determination is made that the status of the device or an application does not preclude the presentation of a content item, the user device determines an urgency score based on the status data (410).

The urgency score can specify a level of urgency related to a user's need to access the user device or content of one or more of the applications installed on the user device. The urgency score can be based on the status data for the user device and/or the status of each application and module for which status data is available. In some implementations, a lower urgency score indicates less urgency than a higher urgency score. In such implementations, it may be appropriate to present a content item for low urgency scores (e.g., urgency scores that do not meet a threshold urgency score), while precluding the display of a content item for high urgency scores (e.g., urgency scores that meet a threshold urgency score).

Each particular status can affect the urgency score and can be weighted based on its relative importance. For example, social networking notifications may be given less weight than the weight given for the level of charge on the battery or for missed calls. Each particular status can also be evaluated differently to determine its effect on the urgency score. For example, the urgency score can be increased as the level of battery decreases, or as the number of notifications (e.g., for a single application or a combination of multiple applications) increases.

In some implementations, the urgency score may be initialized at a particular value, such as zero. Each particular status can be used to add to or subtract from the urgency score. For example, notifications for a messaging application may add to the urgency score, while a fully charged battery may subtract from the urgency score. The amount that a particular status affects the urgency score can vary based on the type of status. For example, the urgency score may be incremented by a first amount (e.g., 1.0) for each text message received since the user device was last accessed. The urgency score may also be incremented by a second amount (e.g., 2.0) that is different than the first amount for each missed call or voicemail message received since the user device was last accessed.

The amount by which the urgency score is incremented for a particular piece of status data can be based on the relative urgency of the status data. For example, an emergency notification may result in greater increments to the urgency score than social networking notifications. The amount by which the urgency score is incremented for a particular status may also vary based on the relative urgency related to its associated application or module. For example, a low battery notification may be issued for battery levels less than 20% of full charge, while a very low battery notification may be issued for battery levels less than 5% full charge. In this example, the urgency score may be increased by one point for low battery notifications and increased by five points for very low battery notifications. By way of another example, the urgency score may be increased by one point for each text message received up to five text messages. For text messages greater than ten, the urgency score may be increased by two points.

In some implementations, the amount by which the urgency score is incremented for a particular piece of status data can be based on historical user response to the same or similar status data. For example, if a user typically accesses a messaging application in response to the presentation of a messaging notification (e.g., a new message notification) when the user device is accessed, such notifications may result in a greater increase in the urgency score than the increase in the urgency score in response to a notification that the user often ignores (e.g., by activating the user device, being presented with the notification, and not accessing the notification or the application from which the notification originated).

Historical response data for particular notifications and status data can also be aggregated across multiple users. For example, if a group of users typically access particular phone notifications, while ignoring or delaying access to social networking notifications, the increase to the urgency score due to the particular phone notification may be greater than the amount that the urgency score is increased for social networking notifications for users in the group.

The amount of time since the user device was last accessed and the number of times the user device has been accessed recently (e.g., within a threshold period of time) can also affect the urgency score. For example, if the user has not accessed the user device for more than a threshold period of time, the urgency score may be increased (e.g., incremented by a pre-determined amount). Similarly, if the user device has been accessed many times recently (e.g., more than a threshold number of times during a particular period of time), the urgency score may be increased as the user may be checking for something in particular and the presentation of a content item may be distracting. If the user has accessed the user device recently (e.g., within a threshold amount of time), but infrequently (e.g., less than a particular number of times within the threshold amount of time), the urgency score may be reduced as the user may be casually checking for updates.

The motion of the user device may also affect the urgency score. If the user device is in motion, for example because the user is walking, the urgency score may be increased (e.g., incremented by a pre-determined amount) as the user is likely attempting to quickly check something and presenting a content item may be distracting to the user. If the user device is stationary, this may be considered an indication that the user can focus on the device and the urgency score may be reduced. For example, the urgency score may be decremented by a pre-determined amount in response to determining that the user device has been stationary (or has not moved more than a threshold amount) for at least a threshold amount of time.

The urgency score may be increased if the user has recently changed environments as the user may be getting acclimated to the new environment (e.g., incremented by a pre-determined amount). For example, if the user moved from his car to an outside area, the user may be accessing the user device to obtain walking directions to another location. Similarly, if the user has traveled from one city to a different city, the urgency score may be increased (e.g., incremented by a pre-determined amount) because the user may need to obtain information about the different city. The urgency score may be reduced (e.g., decremented by a pre-determined amount) in response to the environment being the same or similar for at least a threshold period of time.

For opportunities to present a content item prior to the presentation of selected content, such as a selected video, the user device (or a content provider such as a video provider) may determine the urgency score based on data regarding previous interactions with a user interface that presents the content. For example, if the user is browsing videos using a video player by selecting top videos or videos related to a previously viewed video, the urgency score may be reduced (e.g., decremented by a pre-determined amount in response to the selection of at least a threshold number of top or related videos presented to the user) as the user may appear to have time to view an advertisement or other content item. Conversely, if the user has been viewing only short segments of videos and quickly returning to search results page to find other videos, the user may have a specific purpose and may not have time to view an advertisement or other content item. In this situation, the urgency score may be increased. For example, the urgency score may be incremented by a pre-determined amount in response to returning to the search results page at least a threshold number of times in a user session or sequentially. Thus, the number of videos selected and the portion of the videos viewed can be used to determine the urgency score.

The length of a user session with a video player or other content presenting user interfaces can also affect the urgency score. For example, the urgency score may be increased (e.g., incremented by a pre-determined amount) for new user sessions as the user may have a specific purpose. Conversely, if the user session has lasted for more than a threshold amount of time, the urgency score may be reduced (e.g., decremented by a pre-determined amount) as the user may have more time to spend viewing a content item.

A determination is made whether the urgency score meets an urgency threshold (412). If the urgency score meets or exceeds the urgency threshold, a selection is made to respond to the opportunity to present a content item by precluding the presentation of a content item (414). That is, a content item is not presented to the user in response to the presentation opportunity. The user may access the user device, applications of the user device, and/or content of the applications without first viewing a content item.

If the urgency score does not meet or exceed the urgency threshold, a selection is made to respond to the opportunity to present a content item by presenting a content item. A content item is selected for presentation (416). For example, a content item may be selected from content items stored in a content item data store and that were received from a content distribution system. The content item may be selected based on context data (e.g., recent searches, location of the user device, applications recently used, or web pages recently viewed) and on the urgency score. For example, if recent searches are related to sporting goods, an advertisement related to sporting goods may be selected.

In some implementations, the urgency score can be used to select content items. For example, the urgency score can be used to filter content items based on duration. For higher urgency scores (i.e., urgency scores indicating that the user may have a high sense of urgency, but do not meet the threshold urgency score), the content items eligible for presentation may be limited to those having a short duration. The urgency score can also be used to select content for a content item. For example, an advertisement that includes a discount for a restaurant may be selected based on recent user queries for restaurants. The amount of the discount may vary based on the urgency score. For example, the amount of the discount may be increased for higher urgency scores and reduced for lower urgency scores.

By way of another example, assume that an advertisement for a bank has been selected for presentation. In this example, the content related to opening a new account (or something else that may require a significant amount of time to complete) may be selected for inclusion in the advertisement for lower urgency scores. For higher urgency scores, content that enables the user to save a bookmark or a phone number for the bank may be selected for presentation in the advertisement. This is an action a user can quickly complete if the user is interested in the advertisement.

The urgency score can also be used to determine a size or template for presenting a content item. For example, if the urgency score is higher than a threshold, a smaller version of a content item may be displayed. Conversely, if the urgency score is less than a threshold, a larger version of the content item that includes more content may be displayed.

For video-based content items, the urgency score can be used to filter pre-roll video advertisements by duration. For example, the maximum duration for eligible pre-roll advertisements may be reduced for higher urgency scores. The user device (or video player) may also determine whether to allow the user to bypass and/or a minimum duration of the pre-roll video that has to play before the advertisement may be bypassed using the urgency score. For example, if the urgency score exceeds a first threshold, the user may be given the option to bypass the advertisement at the beginning of the advertisement. If the urgency score is less than a second threshold, the user may not be given the option to bypass the advertisement. For urgency scores between the first and second thresholds, the user may be given the option to bypass the advertisement after a particular duration of the advertisement has played. The particular duration can be increased for lower urgency scores and increased for higher urgency scores.

A video-based content item may include multiple versions, each with a different duration. For example, a particular advertisement may include a ten second version and a twenty second version. The version selected for a particular opportunity to present a content item may be selected based on the urgency score. In this example, if the urgency score exceeds a threshold urgency score, the shorter version (e.g., the ten second version) may be selected as the user may want quicker access to a requested video. Conversely, if the urgency score is less than a threshold urgency score, the longer version (e.g., the twenty second version) may be selected as the user may have more time to view the content item.

The selected content item is presented in response to the opportunity to present a content item (418). The selected content item may be presented in a manner that temporarily precludes the user from accessing the device or content. For example, the selected content item may be presented upon the unlocking of a device in a manner that calls for the user to dismiss the content item or to view the content item prior to accessing the device. If the presentation opportunity is related to a video player, a pre-roll content item may be presented prior to the presentation of a video selected by the user.

Figure 5:
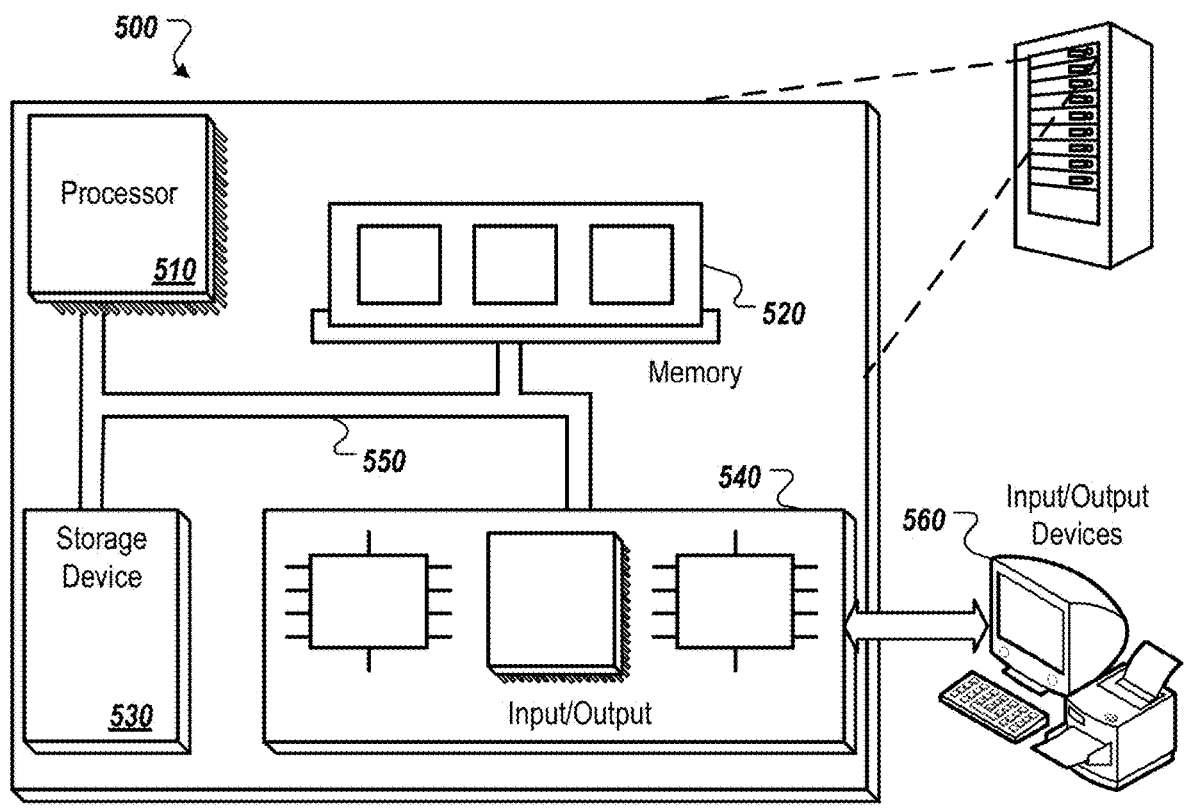
FIG. 5 is block diagram of an example computer system.

FIG. 5 is a block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In one implementation, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method to present content items on user devices, comprising:
    by one or more computing devices:
        configuring an application to present content items on a user interface of a user computing device;
        identifying an opportunity to serve a particular content item;
        determining that a usage status of the application indicates that a user of the application is not actively engaged with the application;
        upon determining that the user of the application is not actively engaged, obtaining the particular content item;
        receiving, from the user computing device, one or more statuses associated with the user computing device;
        weighting the one or more received statuses associated with the user computing device;
        adjusting the particular content item based on the one or more weighted statuses; and
        presenting the adjusted particular content item on the user interface of the user computing device.

2. The computer-implemented method of claim 1, wherein the one or more statuses of the user computing device are based on one or more of a battery level of the user computing device, a quantity of notifications from applications operating on the user computing device, and a quantity of interactions with the user computing device.

3. The computer-implemented method of claim 1, further comprising:
receiving, by the one or more computing devices, an input of a request to remove the presentation of the particular content item on the user interface; and
removing, by the one or more computing devices, the presentation of the particular content item from the user interface.

4. The computer-implemented method of claim 1, wherein the application presents a website and the particular content item is presented on a webpage.

5. The computer-implemented method of claim 1, wherein the particular content item is provided by a content distribution computing system, the method further comprising:
determining a manner in which the particular content item will be presented based on the one or more received statuses, including determining whether to preclude access to the user computing device by presentation of the particular content item based on the one or more statuses.

6. A computer program product, comprising:
a non-transitory computer-readable storage device having computer-executable program instructions embodied thereon that when executed by a computer cause the computer to present content items on user devices, comprising computer-executable program instructions to:
configure an application to present content items on a user interface of a user computing device;
identify an opportunity to serve a particular content item;
determine that a usage status of the application indicates that a user of the application is not actively engaged with the application;
obtain the particular content item upon determining that the application is not actively engaged
determine a status of the user computing device;
based on the status of the user computing device, select a presentation size of the particular content item; and
present the particular content item with the selected presentation size on the user interface of the user computing device.

7. The computer program product of claim 6, wherein the status of the user computing device is based on one or more of a battery level of the user computing device, a quantity of notifications from applications operating on the user computing device, and a quantity of interactions with the user computing device.

8. The computer program product of claim 6, further comprising computer-executable instructions to:
receive an input of a request to remove the presentation of the particular content item on the user interface; and
remove the presentation of the particular content item from the user interface.

9. The computer program product of claim 6, wherein the application is a website and the particular content item is presented on a webpage.

10. The computer program product of claim 6, wherein the particular content item is provided by a content distribution computing system.

11. A system to present content items on user devices, comprising:
a storage device;
and
a processor communicatively coupled to the storage device, the processor executing application code instructions that are stored in the storage device to cause the system to:
configure an application to present content items on a user interface of a user computing device;
identify an opportunity to serve a particular content item;
determine that a usage status of the application indicates that a user of the application is not actively engaged with the application;
upon determining that the user of the application is not actively engaged, obtain the particular content item
determine a status of the user computing device;
based on the status of the user computing device, select a presentation size of the particular content item; and
present the particular content item with the selected presentation size on the user interface of the user computing device.

12. The system of claim 11, wherein the status of the user computing device is based on one or more of a battery level of the user computing device, a quantity of notifications from applications operating on the user computing device, and a quantity of interactions with the user computing device.

13. The system of claim 11, wherein the processor further executes application code instruction to cause the system to:
receive an input of a request to remove the presentation of the particular content item from the user interface; and
remove the presentation of the particular content item from the user interface.

14. The system of claim 11, wherein the application presents a website and the particular content item is presented on a webpage.

15. The system of claim 11, wherein the particular content item is provided by a content distribution computing system.

16. The system of claim 11, wherein the processor further executes application code instruction to cause the system to access a second application on the user computing device in response to a user interaction with the particular content item presented on the user interface of the user computing device.

17. The computer-implemented method of claim 1, further comprising accessing a second application on the user computing device in response to a user interaction with the particular content item presented on the user interface of the user computing device.

18. The computer program product of claim 6, further comprising computer-executable instructions to access a second application on the user computing device in response to the user interaction with the particular content item presented on the user interface of the user computing device.

* * * * *